United States Patent [19]

Eddleman

[11] 4,169,776
[45] Oct. 2, 1979

[54] METHOD FOR RECOVERY OF METALLIC ZINC FROM CHLORINE CONTAMINATED SKIMMINGS

[75] Inventor: William L. Eddleman, Houston, Tex.

[73] Assignees: David B. Dean, Houston; Douglas B. Hayden, Jr., Beaumont, both of Tex.; part interest to each

[21] Appl. No.: 909,353

[22] Filed: May 25, 1978

Related U.S. Application Data

[63] Continuation of Ser. No. 737,727, Nov. 1, 1976, abandoned, which is a continuation of Ser. No. 610,246, Sep. 4, 1975, abandoned.

[51] Int. Cl.² ............................ C25C 1/16; C25C 7/04
[52] U.S. Cl. ..................................... 204/118; 204/296
[58] Field of Search ............... 204/117, 119, 128, 296, 204/105 R, 263, 264, 118

[56] References Cited

U.S. PATENT DOCUMENTS

| | | | |
|---|---|---|---|
| 1,303,226 | 5/1919 | Allen | 204/119 |
| 3,103,474 | 9/1963 | Juda | 204/105 R |
| 3,679,538 | 7/1972 | Druin et al. | 161/159 |
| 3,694,281 | 9/1972 | Leduc | 204/296 |

OTHER PUBLICATIONS

Ind. Eng. Chem., Prod. Res. Develop., vol. 13, No. 1, 1974, pp. 2–9.
Celgard Microporous Polypropylene Film, Technical Bulletins, issued by Celanese Corporation.

*Primary Examiner*—T. M. Tufariello
*Attorney, Agent, or Firm*—Sigalos & Levine

[57] ABSTRACT

A method and apparatus for recovery of elemental zinc from zinc scrap, typically skimmings, is disclosed. Zinc skimmings include chlorine as a zinc chloride contaminate. Chlorine liberation in zinc electrolytic refining techniques in an acid bath has failed heretofore because the elemental chlorine attacks the equipment as hydrochloric acid as well as producing a reversible chemical reaction. This method and apparatus capture the chlorine gas and remove it, enabling the process to continue indefinitely where elemental zinc is recovered at a cathode in a zinc sulfate bath which is separated from the anode by a permeable diaphragm. The process separates and removes chlorine and also collects the metal at the cathode, separates the sulfuric acid from the catholyte by transferring it by electrodialysis across the diaphragm into the anode compartment for re-use and also by this recycle enables the process to continue in operation indefinitely.

7 Claims, 1 Drawing Figure

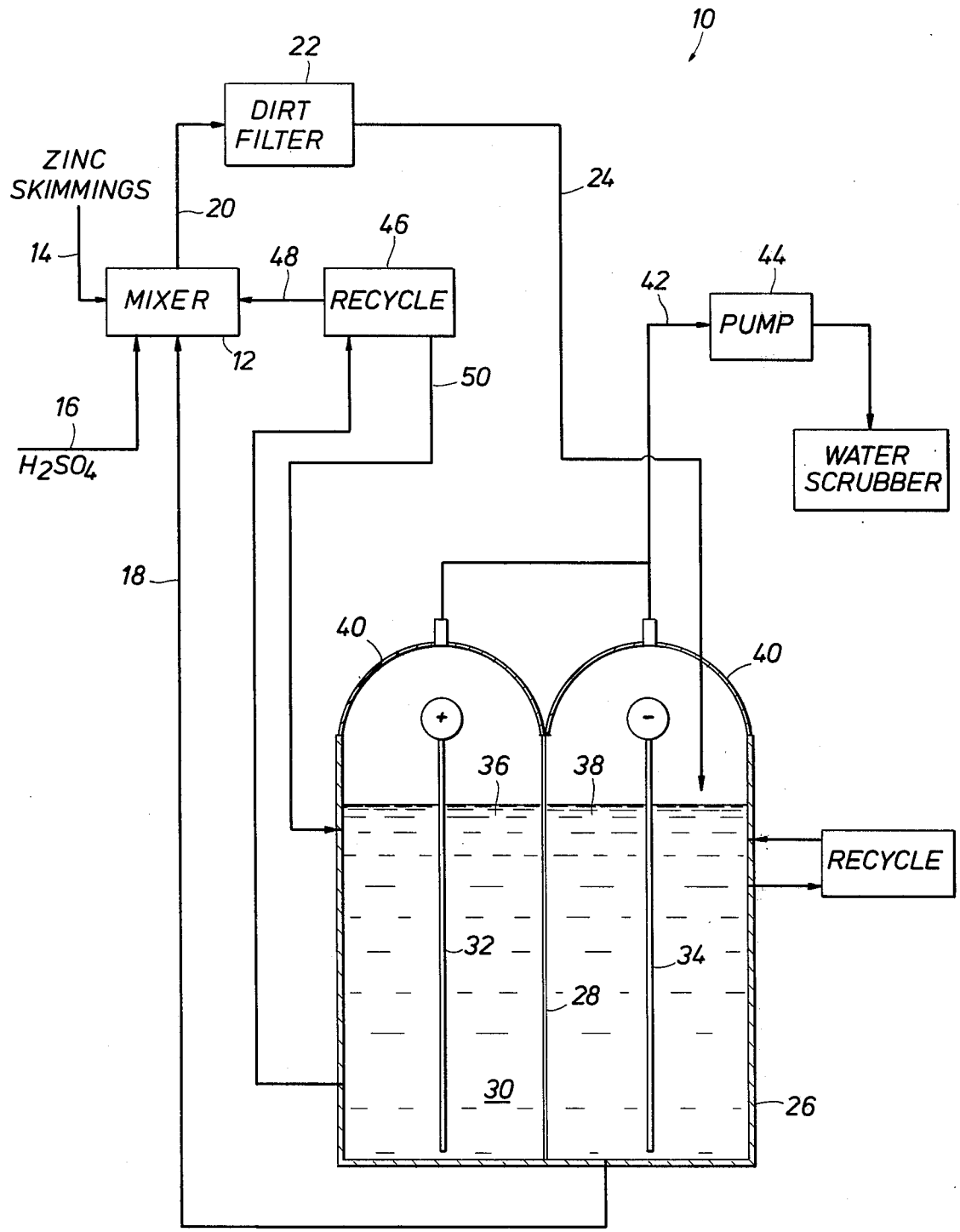

METHOD FOR RECOVERY OF METALLIC ZINC FROM CHLORINE CONTAMINATED SKIMMINGS

This disclosure is a continuation of application Ser. No. 737,727, filed Nov. 1, 1976, now abandoned, which is, in turn, a continuation of application Ser. No. 610,246, filed Sept. 4, 1975, now abandoned.

BACKGROUND OF THE INVENTION

Zinc skimmings are normally recovered from galvanizing plants. These skimmings are a waste product of galvanizing and typically have as a major constituent zinc chloride. The zinc chloride skimmings are a result of the Flux used for treatment of steel prior to galvanizing. As the Flux looses strength the zinc skimmings are recovered. They are presently treated as by product or waste.

In the past, attempts have been made to recover elemental zinc from skimmings containing zinc chloride. Recovery of elemental zinc through electrolysis has been commercially difficult and in fact impossible because the recovery process liberates chlorine. Chlorine is very active chemically and customarily attacks all the materials associated with the process. When this occurs, the process equipment very rapidly disenegrates and is no longer usable.

The method and apparatus herein enables the recovery of elemental zinc and elemental chlorine gas. The two are recovered and separated, the chlorine gas being drawn away from the process equipment. The process equipment is made of fiberglass, carbon and plastics which are resistant to chlorine attack. The hood design and vacuum pump are so constructed and designed to also be resistant to chlorine attack and containment. The separation of the chlorine gas enables it to be recovered as a valuable by-product. Moreover, the zinc is recovered in a form which enables it to be subsequently processed and sold as a valuable product of the process.

SUMMARY OF THE INVENTION

The method and apparatus of this disclosure are directed to recovery of the zinc from zinc skimmings. The method contemplates the mixing of the zinc skimmings with water and sulfuric acid, forming a catholyte mixture with chloride contaminate as zinc chloride. This mix is introduced on the cathode side of a sulfuric acid bath initially having a pH of about 1. The bath is divided by a diaphragm across the center. The diaphragm has sized pores permitting ions to pass but water is blocked. The anode side of the bath is started with pure water. It has an anode and a cathode. The DC current is passed through the bath. The zinc skimming mixture, or catholyte, has cations and anions. Elemental zinc is recovered near the cathode. It is recovered in a crystalline form which forms brittle platelets on the cathode. Nacent elemental chlorine gas forms as bubbles and rises to the surface of the bath and is recovered through an overhead hood connected to a vacuum pump means which introduces the chlorine into a water scrub which recovers the chlorine.

The apparatus preferably includes a bath having the anode and cathode positioned therein and separated by a permeable diaphragm. The electrodes are preferably completely covered with a hood to recover chlorine gas bubbling from them. At the anode side, pure sulfuric acid is obtained and a portion thereof is routinely removed to mix with the skimmings as the process continues indefinitely, by the sulfuric acid being mixed with the newly introduced zinc skimmings. The acid mixture creates zinc sulfate in solution, which is introduced into the cathode side of the bath. The sulfate anion passes through the permeable diaphragm to the anode side of the bath. Water in the bath breaks down at the anode, liberating nacent oxygen and nacent hydrogen. The nacent hydrogen recombines with the sulfate anion at the anode to form sulfuric acid. The hydrochloric acid breaks down and liberates chlorine. On the cathode side, zinc sulfate and zinc chloride are attracted to the vicinity of the cathode. As the ions collide with the cathode plate they give up their positive charge, thereby liberating hydrogen and nacent chlorine in the immediate vicinity. They recombine as hydrochloric acid which then migrates across the diaphragm to the anode. Some nacent hydrogen and nacent chlorine escape as a gas into the collecting hood. The zinc ions in solution adhere to the cathode as elemental zinc when they give up their positive charge. Periodically, zinc platelets are recovered from the cathode. Chlorine gas is recovered continuously in the atmosphere just above the anode and the cathode along with some oxygen and hydrogen. The method and apparatus recover zinc having a value greater than the electrical power and acid consumed by the process. Once the process begins, very little additional sulfuric acid is required to be added. The sulfuric acid is recovered in the anode compartment and is mixed continuously with the newly introduced zinc skimmings.

DESCRIPTION OF THE DRAWINGS

A single drawing is a flow chart of the apparatus of the present invention.

DESCRIPTION OF THE PREFERRED EMBODIMENT

The method and apparatus described herein will be related in conjunction with a description of the flow chart. In the flow chart, the numeral 10 identifies the apparatus. The apparatus is represented in schematic block form which is sufficiently detailed to enable the construction of the apparatus of the present disclosure. The processing apparatus 10 thus includes a mixer 12. The mixer 12 is periodically provided with the zinc skimmings which are input at 14. The zinc skimmings are the wet or dry materials recovered from a galvanizing plant, and in particular include a substantial amount of zinc chloride. The zinc chloride may be mixed with other zinc compounds and foreign matter. In any case, it is introduced to the mixer.

The mixer is also provided with the supply of sulfuric acid at 16. The sulfuric acid at 16 is introduced to begin the process but it need not be continued because the process is self sustaining insofar as the sulfuric acid supply is concerned. It is self sustaining in the sense that once adequately charged with a sufficient volume of sulfuric acid only makeup sulfuric acid is thereafter required. The makeup is necessary because some is occasionally lost due to evaporation, splashing out of the equipment and so on. The process has a net consumption of sulfuric acid which is fairly low once the process begins. The supply of sulfuric acid at 16 is thus introduced to the mixer. In addition, the numeral 18 identifies a supply of water. The water which is introduced need not be perfectly pure but it is sufficiently pure that it does not interfere with the process to be described. Since this is a recovery process, it is generally permissible to operate with less than pure chemicals. As a matter of fact, the water need not be pure. The zinc skimmings, sulfuric acid and water are mixed to enable intimate wetting with the acid solution. The entire output of the mixer 12 is provided in a conduit 20 to a dirt and trash filter 22. The filter 22 removes insoluble materials and delivers the filtrate in a conduit 24.

The conduit 24 introduces the filtrate as an acid bath solution in a container 26. The container 26 is divided along the center by a permeable diaphragm 28. The diaphragm 28 is acid resistant, but ion or cation permeable. A suitable membrane is the Celanese Plastics Corporation semi-permeable film which sells under the trademark "Celgard". This product by Celanese is an open-celled microporous polymer (polypropylene) film disclosed and described in U.S. Pat. No. 3,679,538, which is inherently hydrophobic and specially processed to provide a pore structure which provides a barrier to water and is the preferred membrane. Membranes made of other olefins can also be used so long as they have the same pore and water barrier properties as the polypropylene film and U.S. Pat. No. 3,679,538, discloses that suitable olefins for this purpose are polyethylene, poly-3-methyl butene-1, and the like, and copolymers thereof. The films (membranes) have a reduced bulk density as compared to the bulk density of the corresponding films having no open-celled structure, a crystallinity of above about 30 percent, a pore size of less than 5,000 angstroms, and a nitrogen flux greater than 35.4 and are prepared, as discussed in U.S. Pat. No. 3,679,538, by the consecutive steps of cold stretching, hot stretching, and heat-setting a non-porous, crystalline, elastic film made of a polymer discussed above. The diaphragm preferably has a typical pore size of about 40 angstroms width and a length of up to about 400 angstroms. Pores of this size permit the migration of acid anions across the membrane. However, the diaphragm blocks the migration of certain molecules as will be mentioned. In particular, water of hydration is not permitted to cross the diaphragm. The water of hydration sometimes carries with it polluting chemicals. This open celled microporous polymer diaphragm is characterized by having a reduced bulk density as compared to the bulk density of the corresponding polymer film having no open-celled structure, a crystallinity of above about 30%, a pore size of less than 5,000 angstroms, and a nitrogen flux, measured after one hour storage at 65° C., of more than 30.

As illustrated, the diaphragm 28 extends substantially above the surface of the liquid 30 in the tank. The tank is divided into two compartments by the diaphragm. An anode 32 is located on one side of the diaphragm. It is typically formed of carbon. It is connected with a DC power source. A cathode 34 is placed on the opposite side of the diaphragm and is connected in the DC circuit which includes the anode. It is typically of aluminum or steel. Preferably, it has a substantial area and the two electrodes are approximately parallel to one another and are preferably parallel to the diaphragm 28. The spacing is reasonably close, typically the electrodes being about an inch from the diaphragm 28. The DC voltage need not be any higher than about four or five volts. The voltage is in part determined by the electrical resistance of the wiring connecting to the electrodes, the cross sectional thickness of the electrodes and other scale factors. As the electrodes are increased in size, resistance to the current flow decreases and the voltage required drops slightly.

The solution in the vicinity of the cathode is identified by the numeral 38 while the solution near the anode is identified by the numeral 36.

The filtrate which is introduced through the conduit 34 is supplied to the cathode side under a hood 40. The hoods 40 preferably substantially covers over the surface area near both electrodes. The purpose is to collect gasses which bubble to the surface. These gasses are substantially comprised of chlorine, though hydrogen and oxygen are also liberated. The hood 40 has a vacuum line 42 connected to it which is communicated with a vacuum pump 44. The pump 44 delivers the gases and some air to recovery equipment. A second hood 40 covers the anode side and also recovers chlorine. The chlorine gas is separated, and recovered rather than wasted because of its substantial value.

At the beginning of the process, the solution 30 in the tank 26 is substantially sulfuric acid in water solution having a pH of about 1. Some hydrochloric acid present is a contaminate. The next step is to introduce into the tank the filtrate from the conduit 24. The filtrate will be presumed to include zinc metal compounds and even traces of other metal compounds although they typically do not occur in substantial quantities. When introduced, they are dispersed in the catholyte 38.

The catholyte solution 38 includes zinc in several forms. Some of it will be in the form of zinc chloride in solution which forms zinc cations and chloride anions. Some of the zinc will be in the form of zinc sulfate, in solution, which forms the zinc cations and the sulfate anions. The zinc is attracted to the vicinity of the cathode. The cathode provides a surplus of negative charges which enable the ion to be converted to elemental metal at the cathode. Mechanically, this takes the form of zinc crystals which form rather brittle platelets at the cathode. If this were the only step taken, the zinc crystals would go back into solution as metal ions when subjected to chemical attack by the acids in the catholyte 38. However, this is prevented, by the electrodialytic transfer of the nacent sulfate and further, is prevented by capture of chlorine gas in the near vicinity of the cathode. Chlorine gas and hydrogen gas are both liberated in the near vicinity of the cathode. When they are liberated, they either go back into solution as hydrochloric acid or they bubble towards the surface. The nacent hydrogen typically combines with the nacent chlorine to become hydrochloric acid. This nacent hydrochloric acid migrates across the membrane to the anode. Nacent chlorine gas bubbles to the surface and rises above the surface of the catholyte 38. The chlorine gas is drawn into the hood 40 and is recovered through the line 42 communicated with the vacuum pump 44. The chlorine gas is a valuable by-product of this process. Its recovery is a profitable venture inasmuch as it can be readily combined with elemental hydrogen or bubbled into water to form hydrochloric acid in an appropriate strength.

At the anode 32, the electrical charge created in the near vicinity thereof encourages the sulfate anions to migrate through the permeable membrane. Water in the near vicinity of the anode breaks down and some nacent oxygen is liberated. When this occurs, hydrogen is left in the near vicinity of the anode to combine with the migratory sulfate ions. This recombination forms substantially pure sulfuric acid in the near vicinity of the anode. As a consequence, the anolyte becomes substantially purified acid. By contrast, while there is a fairly low pH in the catholyte 38, this results only from the combined introduction of the acidized skimmings in the conduit 24 while the acid anions are continuously drawn away. The zinc sulfate is introduced on the cathode side of the diaphragm. The cathode collects the zinc ion and the liberated acid migrates to the anode side of the diaphragm by the phenomena of electrodialysis.

It was mentioned earlier that the mixer 12 is provided with sulfuric acid from the source 16 only at the beginning. Eventually the amount of acid in the dynamic system is sufficient, other than for makeup purposes, to enable repetitive functioning of the process. To this end, a tank and pump which is identified as recycle apparatus 46 is incorporated. A portion of the acid from the anolyte is removed and provided to the recycle apparatus. A portion of this acid is then delivered through the conduit 48 to the mixer 12. Any surplus is returned to the tank 26 through a conduit 50.

The conduit 50 thus returns some portion of the acid. The remainder of the acid travels in a closed circuit through the recycle apparatus 46, the conduit 48, the mixer 12, and then flows through the conduit 20 to the filter 22. The acid thereafter flows through the conduit 24 and is introduced into the catholyte solution 38. The anion migrates from the catholyte 38 to the anolyte 36. The anolyte 36 is water at the start up of the process, but becomes more acid saturated as the process continues. This describes the cycle of the acid flow.

This process is particularly successful in the recovery of elemental zinc. The zinc is susceptable to acid attack and to this end, acid attack in the near vicinity of the cathode 34 is reduced by recovery and removal of the chlorine gas. Further, even though acid is continually introduced in the filtrate 24, it is nevertheless removed from the catholyte by migration of the sulfate anions across the permeable diaphragm 28 to the anode side. After the process is stabilized, the pH of the catholyte rises substantially. By contrast, the pH of the anolyte stabilizes in the vicinity of about 1. This enables the water supplied by the conduit 18 from the catholyte to be sufficiently pure to be used in this process. At this juncture, when that water is returned to the mixer 12, it will still include only traces of acid and some zinc in solution but this is of no consequence because these are the very things that are added at the mixer 12. The recovery of reasonably pure water from the catholyte solution indicates that the zinc is less likely to go back into solution as metallic ions. This continual recovery of the zinc is in the form of crystallized platelets which, on periodic interruption of the process, can be mechanically removed from the cathode quite easily. This removal is easy. The removal is implemented by removal of the cathode from the solution. It is held over an empty container and rapped sharply. The zinc buildup on the cathode flakes away quite readily. When this occurs, the zinc platelets are easily recovered for subsequent processing as elemental metal. The recovered crystallized zinc platelets are very brittle and highly crystalline. It is mechanically easy to recover and is thereafter processed typically by melting.

The metallic adherence which occurs at the cathode is not "electroplating" but rather is an electro-chemical technique of placing the zinc crystal in a form which enables it to be removed from the container 26.

It is important to observe that chlorine gas is liberated at both electrodes. At the cathode, the chlorine liberation process is an electron exchange, the current providing a surplus electron which converts the chloride salt ion into free chlorine. Any chloride which escapes migrates as hydrochloric acid to the anode and forms chloride gas there in the manner of a chlorine-caustic cell. The chloride readily passes through the membrane during its migration.

The preferable acid for this process is sulfuric acid. It is possible to use other acids such as hydrochloric. Depending on the purity of the skimmings supplied, other metals in trace quantities may be recovered at the cathode.

The foregoing is directed to the preferred method and apparatus of the present invention but the scope thereof is determined by the claims which follow.

I claim:

1. A method of recovering elemental zinc from a solution of zinc compounds which comprises the steps of placing the zinc compounds in solution with an aqueous acid solution in a container divided into anode and cathode compartments containing, respectively, an anode and a cathode by a microporous polymer diaphragm characterized by having a reduced bulk density as compared to the bulk density of the corresponding polymer film having no open-celled structure, a crystallinity of above about 30%, a pore size of less than 5,000 angstroms, and a nitrogen flux, measured after one hour storage at 65° C., of more than 30, which is permeable to anions and acid cations inherently and specially processed to provide a pore structure which provides a barrier to water including water of hydration and flowing a DC current through the anode and cathode positioned in solution on opposite sides of the diaphragm to form elemental zinc at the cathode.

2. The method of claim 1 wherein the zinc compounds include chlorides and elemental chlorine gas is formed at or near the vicinity of the electrodes and removing the chlorine gas from the process solution.

3. The method of claim 2 including the step of introducing at least periodically the zinc compounds with sulfuric acid into the solution and recovering sulfuric acid from the vicinity of the anode.

4. The method of claim 3 including the step of removing sulfuric acid from the vicinity of the anode which is then mixed with an additional supply of zinc compounds and which is introduced then as an acidized aqueous solution of zinc compounds into the cathode side of the container.

5. The method of claim 4 including the step of recovering water from the cathode side of the container.

6. The method of claim 5 wherein the cathode is formed of aluminum or steel and the zinc crystals deposit thereon; and which is at least periodically mechanically removed from the cathode.

7. The method of claim 1 wherein the diaphragm is a hydrophobic open-celled microporous polypropylene film and including the step of introducing the zinc compounds solely on the cathode side of the diaphragm.

* * * * *

UNITED STATES PATENT AND TRADEMARK OFFICE
CERTIFICATE OF CORRECTION

PATENT NO. : 4,169,776
DATED : October 2, 1979
INVENTOR(S) : William L. Eddleman It is certified that error appears in the above—identified patent and that said Letters Patent are hereby corrected as shown below:

Column 6, line 33, after "inherently" add the word --hydrophobic--.

Signed and Sealed this

Eleventh Day of December 1979

[SEAL]

Attest:

SIDNEY A. DIAMOND

Attesting Officer    Commissioner of Patents and Trademarks